United States Patent

[11] 3,588,725

[72] Inventor Philip R. Geffe
Laurel, Md.
[21] Appl. No. 828,170
[22] Filed May 27, 1969
[45] Patented June 28, 1971
[73] Assignee Westinghouse Electric Corporation
Pittsburgh, Pa.

[54] Q-INVARIANT ACTIVE RESONATOR
14 Claims, 3 Drawing Figs.

[52] U.S. Cl. .......... 330/21, 330/31, 330/107, 330/110
[51] Int. Cl. .......... H03f 3/04
[50] Field of Search .......... 330/21, 31, 107, 109, 110, 112; 333/80, 80 (T); 331/117 (Cursory)

[56] References Cited
UNITED STATES PATENTS

| | | | |
|---|---|---|---|
| 3,039,067 | 6/1962 | Brauner .......... | 331/117 |
| 3,296,546 | 3/1967 | Schneider, Jr. .......... | 330/21 |

*Primary Examiner*—Roy Lake
*Assistant Examiner*—Lawrence J. Dahl
*Attorneys*—F. H. Henson and E. P. Klipfel

ABSTRACT: An RC-amplifier resonator having a pole Q which is uniquely invariant under passive element drift. Shifts of filter response with temperature have been minimized without destroying the usefulness of the resonator as a building block for electrical band-pass filters. The two-amplifier resonator has a voltage gain of $-(4Q^2-1)$. The magnitudes of the resistors are equal to each other as are the magnitudes of the capacitances. For a normalized center frequency at unity the resistance magnitudes are unity and the capacitance magnitudes are 1/2Q, or 2Q for the inverse network.

Patented June 28, 1971 3,588,725

WITNESSES:

Bernard R. Gieguey

James F. Young

INVENTOR
Philip R. Geffe

BY Ernest P. Klipfel
ATTORNEY

Q-INVARIANT ACTIVE RESONATOR

BACKGROUND OF THE INVENTION

The present invention relates generally to RC-amplifier resonators and more particularly relates to a resonator with minimized sensitivities with respect to temperature and other passive element drifts.

Active filters may consist of a cascade of isolated resonators, with each resonator supplying a single pair of complex-conjugate poles. It is desirable that such resonators for active filters be as insensitive to temperature drift as possible. The overall performance of a resonator in accordance with the present invention has better thermal stability than can be obtained by any other known RC-active network.

SUMMARY OF THE INVENTION

Briefly, the present invention provides a resonator with outstanding thermal stability by providing first and second amplifier means having a combined gain of $-(4Q^2a/1)$. A firr circuit in accordance with the present invention, when normalized at the center frequency, has resistance magnitudes substantially equal to unity and capacitance values substantially equal to 1/2Q. An inverse network has capacitance values equal to 2Q. A positive feedback Q multiplier provides a high Q design, if desired.

BRIEF DESCRIPTION OF THE DRAWING

Objects and advantages of the present invention will be more readily apparent from the following detailed description taken in conjunction with the drawing, in which.

DESCRIPTION OF THE PREFERRED EMBODIMENTS

Figure 1:
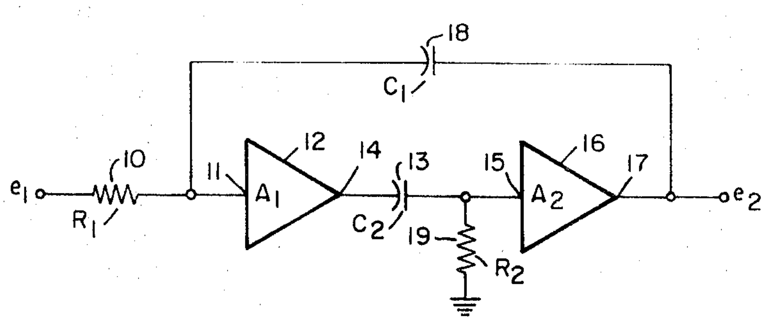
FIG. 1 is an electrical schematic diagram of an illustrative embodiment of the present invention.

Referring to FIG. 1, an input signal $e_1$is fed through a resistance element 10 to the input 11 of an amplifier 12. A capacitance element 13 connects the output 14 of the amplifier 12 to the input 15 of a second amplifier 16. The output signal $e_2$from the output 17 of the amplifier 16 is fed back through a capacitance element 18 to the input 11 of the amplifier 12. A resistance element 19 connects the input 15 of the amplifier 16 to a point of reference potential.

The transfer function $e_1/e_2$of FIG. 1 can be generally stated:

$$e_2/e_1=N(S),/D(S) \quad (1)$$

where S=the frequency operator $j\omega$. Writing the combined gain $A=A_1A_2$, an the general equation for time constants $T_i=R_{in}{}^{C}{}_i$, so that $T_1=R_1C_1$and $T_2=R_2C_2$, the numerator of the gain function $$N(S)=[A/(1-A)T_1]S \quad (2)$$

and the denominator of the gain function $$D(S)=S^2+\left[\frac{T_1+T_2}{(1-A)T_1T_2}\right]S+\frac{1}{(1-A)T_1T_2} \quad (3)$$

for voltage amplifiers having zero input admittance and output impedance.

From equations 2 and 3 above and recognizing that active filters are most practical when realized as a cascade of quadratic sections, the denominator of the gain function can be more simply utilized as having a unit leader $$D(S)=S^2bzaS+b \quad (4)$$

then the pole center frequency $\omega$ and the pole-Q are defined as:

$$\omega_o=\sqrt{b} \quad (5)$$

and $$Q=\frac{\sqrt{b}}{a} \quad (6)$$

$$Q=b/a \quad (6)$$

If the center frequency (pole magnitude) is normalized at $\omega=1$,hen equations 3, 4and 5give a pole center frequency, $$\omega_o=\frac{1}{\sqrt{(1-A)T_1T_2}} \quad (7)$$

and the pole Q is $$Q=\frac{\sqrt{(1-A)T_1T_2}}{T_1+T_2} \quad (8)$$

The design formulas for voltage gain, ohms and farads can be obtained from equations 7 and 8 to be:

$$\left.\begin{array}{l}\omega_o=1\\ A=-(4Q^2-a1)\\ R_1=R_2=1\\ C_1=C_2=1/2Q\end{array}\right\} \quad (9)$$

The differential sensitivities can then be derived; the sensitivity of the pole center frequency $\omega_o$ with respect to the magnitude Z of any one of the four passive elements 10, 19, 13 and 18 being $$S_Z{}^{\omega_o}=-\tfrac{1}{2} \quad (10)$$

The sensitivity of the pole Q and center frequency with respect to the circuit gain can be derived as $$S_A{}^Q=-S_A{}^{\omega_o}=\frac{-A}{2(1-A)}<\tfrac{1}{2} \quad (11)$$

Further, the sensitivity of the pole Q with respect to the first resistance and first capacitance as well as the second resistance and second capacitance are derived to be $$S_{R_1}{}^Q=S_{C_1}{}^Q=\tfrac{1}{2}-\frac{T_1}{T_1+T_2}=0 \quad (12)$$

$$S_{R_2}{}^Q=S_{C_2}{}^Q=\tfrac{1}{2}-\frac{T_2}{T_1+T_2}=0 \quad (13)$$

It is to be noted that all the passive sensitivities of Q are zero. Furthermore, this differential property is very close to being realized in the macroscopic, or actual, sensitivities. Thus, if one of the passive element values is increased by a factor, $1+\epsilon$, then the resulting fractional Q drift is easily calculated from equation 8:

$$\frac{\Delta Q}{Q}=\frac{\sqrt{1+\epsilon}}{1+\frac{\epsilon}{2}}-1\cong-\left(\frac{\epsilon^2}{8+4\epsilon}\right) \quad (14)$$

A passive element drift of 1 percent causes a negative Q drift of about 12 parts per million. Since the Q is independent of passive thermal coefficients, these may be prescribed to hold a constant center frequency. The overall performance will then have better thermal stability than can be obtained by any other known RC-active synthesis network.

Figure 2:
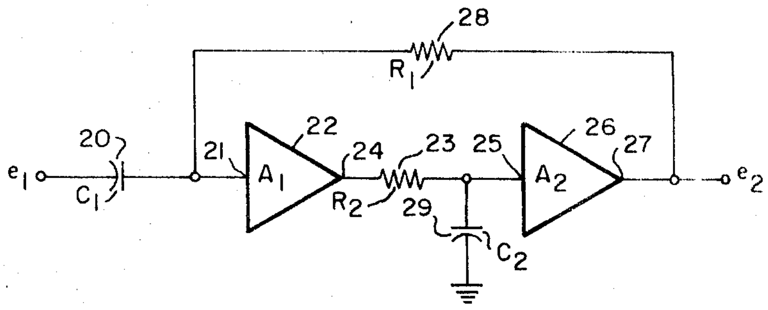
FIG. 2 is an electrical schematic diagram illustrating the inverse network of the circuitry shown in FIG. 1.

FIG. 2 illustrates the inverse network of FIG. 1. The input signal $e_1$ is fed through a capacitance element 20 to the input 21 of a first amplifier 22. A resistance element 23 connects the output 24 of the first amplifier 22 to the input 25 of a second amplifier 26. The voltage $e_2$ appearing at the output 27 of the amplifier 26 is fed back to the input 21 of the amplifier 22 through a resistance element 28. A second capacitance element 29 connects the input 25 of the amplifier 26 to a point of reference potential. It is to be noted that all the passive elements have been interchanged. The resistors utilized in the illustrative embodiment of FIG. 1 have been replaced with capacitors and the capacitors have been replaced with resistors. The design values and differential sensitivities remain as recited by the equations above with one exception. The previous equations are applicable to the network of FIG. 2 except that $$C_1=C_2=2Q \quad (15)$$

Amplifier $A_1$ may be a voltage follower or emitter follower with unity gain. Amplifier $A_2$ should then be an operational amplifier using negative feedback to adjust and stabilize the gain. With the amplifier $A_1$ so chosen, it is easy to prevent self-oscillations when the feedback loop including capacitance element 18 is closed, but the Q is severely gain-limited. In order to obtain high Q with moderate gain, the circuit gain is ideally divided equally between the two amplifiers 12 and 16 with $A_1=2Q$ and $A_2\cong-2Q$, but feedback stability limits such use.

Figure 3:
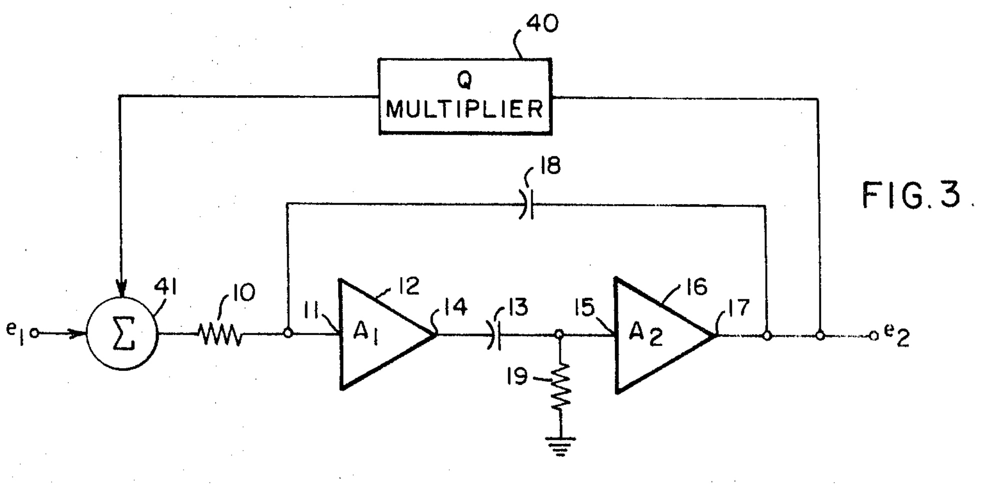
FIG. 3 is an electrical schematic diagram of an illustrative embodiment of the present invention having a high Q.

FIG. 3 provides a high Q and is a modification of the circuitry shown in FIG. 1. Like elements have been assigned identical character references for purposes of clarity. A positive feedback Q multiplier 40 feeds back the output signal $e_2$ to a junction 41 for summing with the input signal $e_1$.

The resonator Q is multiplied by a chosen factor $\theta$ without affecting the center frequency $\omega_o$. The passive sensitivities of Q will also be multiplied by the factor $\theta$, but if these are zero then the Q-invariant property of the network is preserved.

Hence, it is shown that a new RC-amplifier resonator has been provided which is a basic building block for electrical band-pass filters. It has a pole Q which is uniquely invariant under passive element drift. The differential sensitivities of Q to passive elements are all zero. The macroscopic sensitivities of Q to passive elements differ negligibly from zero. The macroscopic sensitivities give a Q drift of about 12 parts per million for a passive element drift of 1 percent. About 300 parts per million Q-drift results from an element drift of 5 percent. The present invention enables subminiature filters to be built without inductors and the filter, in turn, will have outstanding thermal stability.

While the present invention has been described with a degree of particularity for the purposes of illustration, it is to be understood that all modifications, alterations and substitutions within the spirit and scope of the present invention are herein meant to be included.

I claim:

1. A Q invariant active resonator comprising, in combination; first and second amplifier means each including input means and output means; first capacitive means connecting the output means of said second amplifier means to the input means of said first amplifier means; second capacitive means connecting the output means of said first amplifier means to the input means of said second amplifier means, said first capacitive means and said second capacitive means being equal to substantially 1/2Q for a normalized center frequency at unity; first resistive means for connecting an input signal to the input means of said first amplifier means; and second resistive means for connecting the input means of said second amplifier means to a point of reference potential.

2. A Q invariant active resonator comprising in combination; first and second amplifier means each including input means and output means; first resistive means connecting the output means of said second amplifier means to the input means of said first amplifier means; second resistive means connecting the output means of said first amplifier to the input means of said second amplifier; first capacitive means connecting an input signal to the input means of said first amplifier means; and second capacitive means connecting the input means of said second amplifier means to a point of reference potential, wherein the magnitude of the first capacitive means and the second capacitive means are substantially equal to each other and have a magnitude substantially equal to twice the pole Q.

3. The combination of claim 1 wherein the first resistance means and the second resistance means have magnitudes which are substantially equal and equivalent to approximately unity when the pole center frequency is normalized at unity.

4. The combination of claim 1 wherein the product of the gain of said first amplifier means and said second amplifier means is substantially equal to $-(4Q^2a/1)$ where Q is the pole Q.

5. The combination of claim 1 wherein said first amplifier means is a voltage follower and the second amplifier means is an operational amplifier using negative feedback to adjust and stabilize the gain.

6. The combination of claim 1 wherein the first amplifier means is a voltage follower.

7. The combination of claim 1 wherein the individual gain of each of said amplifier means is substantially equal, with the gain of the first amplifier means being twice the pole Q and the gain of the second amplifier means being substantially equal to minus twice the pole Q to obtain a high Q with moderate gain in the resonator.

8. The combination of claim 1 wherein a summing means connects the input signal to the input means of the first amplifier means and a positive feedback Q multiplier means connects a portion of the output from the output means of the second amplifier means to be summed by said summing means along with input signal.

9. The combination of claim 2 wherein the first resistance means and the second resistance means have magnitudes which are substantially equal and equivalent to approximately unity when the pole center frequency is normalized at unity.

10. The combination of claim 2 wherein the product of the gain of said first amplifier means and said second amplifier means is substantially equal to $-(4Q^2a/1)$ where Q is the pole Q.

11. The combination of claim 2 wherein said first amplifier means is a voltage follower and the second amplifier means is an operational amplifier using negative feedback to adjust and stabilize the gain.

12. The combination of claim 2 wherein the first amplifier means is a voltage follower.

13. The combination of claim 2 wherein the individual gain of each of said amplifier means is substantially equal, with the gain of the first amplifier means being twice the pole Q and the gain of the second amplifier means being substantially equal to minus twice the pole Q to obtain a high Q with moderate gain in the resonator.

14. The combination of claim 2 wherein a summing means connects the input signal to the input means of the first amplifier means and a positive feedback Q multiplier means connects a portion of the output from the output means of the second amplifier means to be summed by said summing means along with input signal.